(12) United States Patent
Jiang et al.

(10) Patent No.: US 10,246,600 B2
(45) Date of Patent: Apr. 2, 2019

(54) PREPARATION OF HIGH SOLID YELLOW PIGMENT SLURRY

(71) Applicant: BEHR PROCESS CORPORATION, Santa Ana, CA (US)

(72) Inventors: Yunfei Jiang, Fountain Valley, CA (US); Laurence Teachout, Aliso Viejo, CA (US); Ming-Ren Tarng, Irvine, CA (US); Joseph Pace, Riverside, CA (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 0 days.

(21) Appl. No.: 15/728,753

(22) Filed: Oct. 10, 2017

(65) Prior Publication Data
US 2018/0030303 A1 Feb. 1, 2018

Related U.S. Application Data

(63) Continuation of application No. 14/528,344, filed on Oct. 30, 2014, now Pat. No. 9,790,391.

(51) Int. Cl.
C09D 17/00 (2006.01)
C09B 67/00 (2006.01)

(52) U.S. Cl.
CPC .................. *C09D 17/001* (2013.01)

(58) Field of Classification Search
None
See application file for complete search history.

(56) References Cited

U.S. PATENT DOCUMENTS

| | | | |
|---|---|---|---|
| 5,985,987 A | 11/1999 | Adolfsson et al. | |
| 6,818,050 B1 | 11/2004 | Nyssen | |
| 7,172,653 B2 | 2/2007 | Reisacher et al. | |
| 7,198,667 B2 | 4/2007 | Klopp et al. | |
| 7,318,864 B2 | 1/2008 | Reisacher et al. | |
| 7,384,472 B2 | 6/2008 | Schweikart et al. | |
| 7,842,757 B2 * | 11/2010 | Roy | C09B 67/0063 523/351 |
| 7,846,997 B2 | 12/2010 | Kruithof et al. | |
| 8,372,195 B2 | 2/2013 | Henry et al. | |
| 2011/0290375 A1 | 12/2011 | Hertz et al. | |

FOREIGN PATENT DOCUMENTS

JP 0268178 A 3/1990

OTHER PUBLICATIONS

Restriction Requirement dated Nov. 13, 2015 for U.S. Appl. No. 14/528,344, filed Oct. 30, 2014, 5 pgs.
Non-final Office Action dated Feb. 12, 2016 for U.S. Appl. No. 14/528,344, filed Oct. 30, 2014, 7 pgs.
Final Office Action dated Aug. 19, 2016 for U.S. Appl. No. 14/528,344, filed Oct. 30, 2014, 5 pgs.
Final Office Action dated Mar. 2, 2017 for U.S. Appl. No. 14/528,344, filed Oct. 30, 2014, 7 pgs.
Notice of Allowance dated Jun. 12, 2017 for U.S. Appl. No. 14/528,344, filed Oct. 30, 2014, 7 pgs.

* cited by examiner

*Primary Examiner* — Vu A Nguyen
(74) *Attorney, Agent, or Firm* — Brooks Kushman P.C.

(57) ABSTRACT

A method for forming a pigmented aqueous slurry includes a step of combining a dispersant having pigment affinic groups with water to form an aqueous dispersant mixture. Pigment is added to the aqueous dispersant mixture to form an aqueous pigment mixture. The aqueous pigment composition is ground until the average particle size is less than 30 microns to form a pigmented aqueous slurry.

9 Claims, 2 Drawing Sheets

US 10,246,600 B2

PREPARATION OF HIGH SOLID YELLOW PIGMENT SLURRY

CROSS-REFERENCE TO RELATED APPLICATIONS

This application is a continuation of U.S. application Ser. No. 14/528,344 filed Oct. 30, 2014, pending, the disclosure of which is hereby incorporated in its entirety by reference herein.

TECHNICAL FIELD

The present invention is related to pigmented slurries to be used in paint compositions.

BACKGROUND

Paint compositions are well known to be available in a number of colors. The aesthetic appearance of surfaces coated with these paints, the ease of use, and the long term durability of painted surfaces are important considerations. Water based (e.g., latex paints) and oil-based paints are generally available. Hiding ability and contrast ratio are particularly important properties of a colored paint composition. Typically, oil-based paints are superior to latex paints in this regard.

Typical paint compositions include pigment, binder, liquid and additives. Pigments are used to provide color and opacity to paint. Pigments can be either chemically organic or inorganic. Titanium oxide is an example of a prime pigment used in latex and oil-based paints having a white color. Moreover, pigments also typically add hiding properties to paint. Extender pigments are added to improve certain properties (e.g., scrub, stain, and chalk resistance) and to provide bulk to reduce cost. Additives are included to improve various chemical and physical properties of the paint. The liquids carry the components of the paint composition. In latex paints, the liquid is usually water.

Currently available yellow and yellow-containing colored paints are well-known for poor hiding, if organic yellow pigments are used to bring up bright colors. When yellow pigments are tinted in paint, the shooting level of colorant determines the hiding of deep base paints. However, only a limited amount of colorant can be added to base paint without negatively impacting paint performance, such as surfactant leaching, block resistance, film hardness, color rub-off, etc. A high volume of solid yellow pigments is a key factor to improve hiding without diminishing paint performance. Due to the high oil absorption of organic pigment, it is very difficult to achieve high solid content in slurries.

Accordingly, there is a need for improved paint formulation that addresses the challenges for high solid yellow colorants.

SUMMARY

The present invention solves one or more problems of the prior art by providing, in at least one embodiment, a method for forming a pigmented aqueous slurry for latex paint compositions. The method includes a step of combining a dispersant having pigment affinic groups with water to form an aqueous dispersant mixture. At least one pigment is added to the aqueous dispersant mixture to form an aqueous pigment mixture. Aqueous pigment is ground composition until the average particle size is less than 30 microns to form a ground pigmented aqueous dispersion.

In another embodiment, a method for forming a pigmented aqueous slurry for latex paint compositions is provided. The method includes a step of combining a dispersant having pigment affinic groups with water to form an aqueous dispersant mixture. Characteristically, the dispersant has a polyacrylate backbone with polyetheramine side chains. At least one pigment is then added to the aqueous dispersant mixture to form an aqueous pigment composition. Typically, the pigment has a color with a CIE 1931 color space dominant wavelength from 570 to 590 nm. The aqueous pigment is ground composition until the average particle size is less than 30 microns to form a pigmented aqueous slurry.

Advantageously, the methods of the invention provide a pigmented slurry that is used to tint paint to certain colors, and in particular, yellow-containing colors. The paint formulation achieves superior performance properties through a specific dispersant selection and grinding process.

DETAILED DESCRIPTION

Figure 1A:
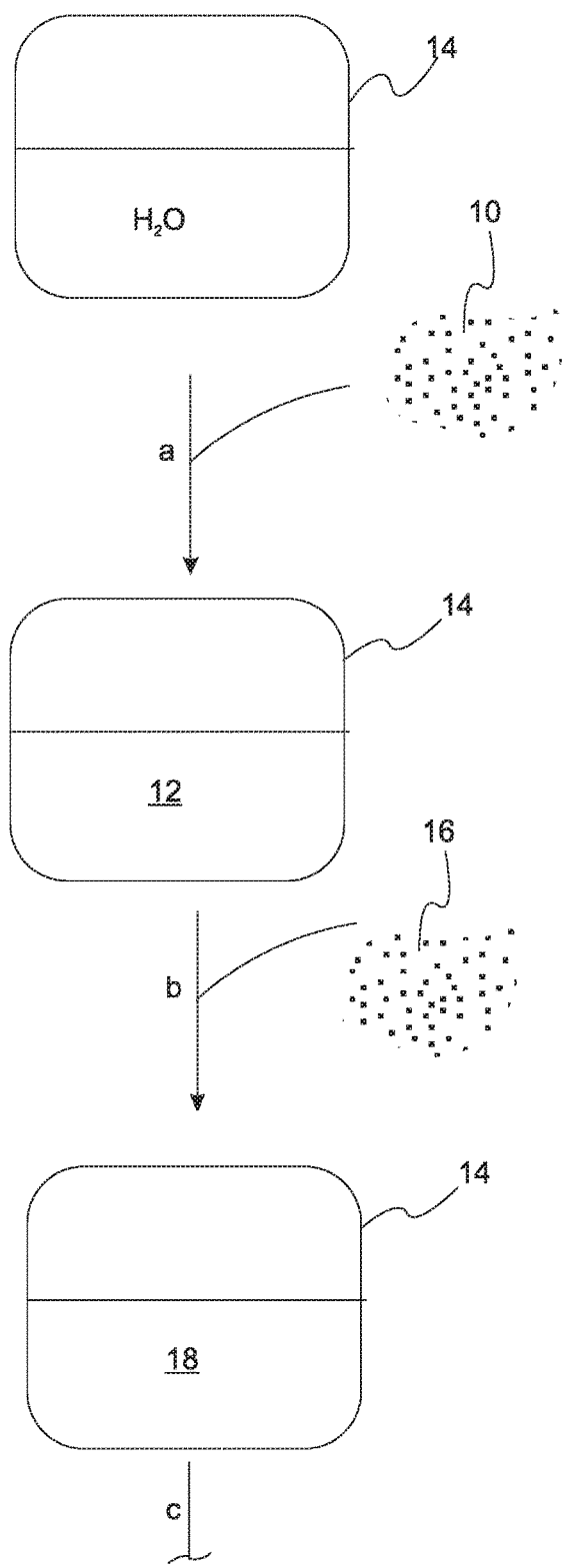
FIGS. 1A and 1B provide a schematic flowchart illustrating preparation of a pigmented aqueous dispersion for latex paint compositions.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "pigment affinic group" as used herein refers to functional groups or moieties that interact with pigment molecules. Examples of such functional groups include carboxyl moieties, phosphoric ester moieties, sulphonic ester moieties, ammonium moieties, and combinations thereof.

The term "contrast ratio" as used herein refers to the ability of a coating to prevent the transmission of light. The terms "opacity" and "hiding power" are often used interchangeably with "contrast ratio." In a refinement, the contrast ratio is determined in accordance to ISO 2814:1973 by applying a wet film coating composition (e.g., a paint) to a substrate having a black and white pattern. When the coating has dried, a spectrophotometer is used to measure the amount of light reflected from the coated black areas of the substrate. The value of the reflected light is expressed as a percentage of the amount of light reflected from the coated white areas. A completely opaque coating will have a value of 100%.

The term "dominant wavelength" refers to a way of describing polychromatic light mixtures in terms of monochromatic light that evokes an identical perception of hue. It is determined on the CIE color coordinate space by straight line the color coordinates for the color of interest and the coordinates for the illuminate. The intersection at the perimeter of the coordinate space nearest the color of interest is the dominant wavelength.

Figure 1B:
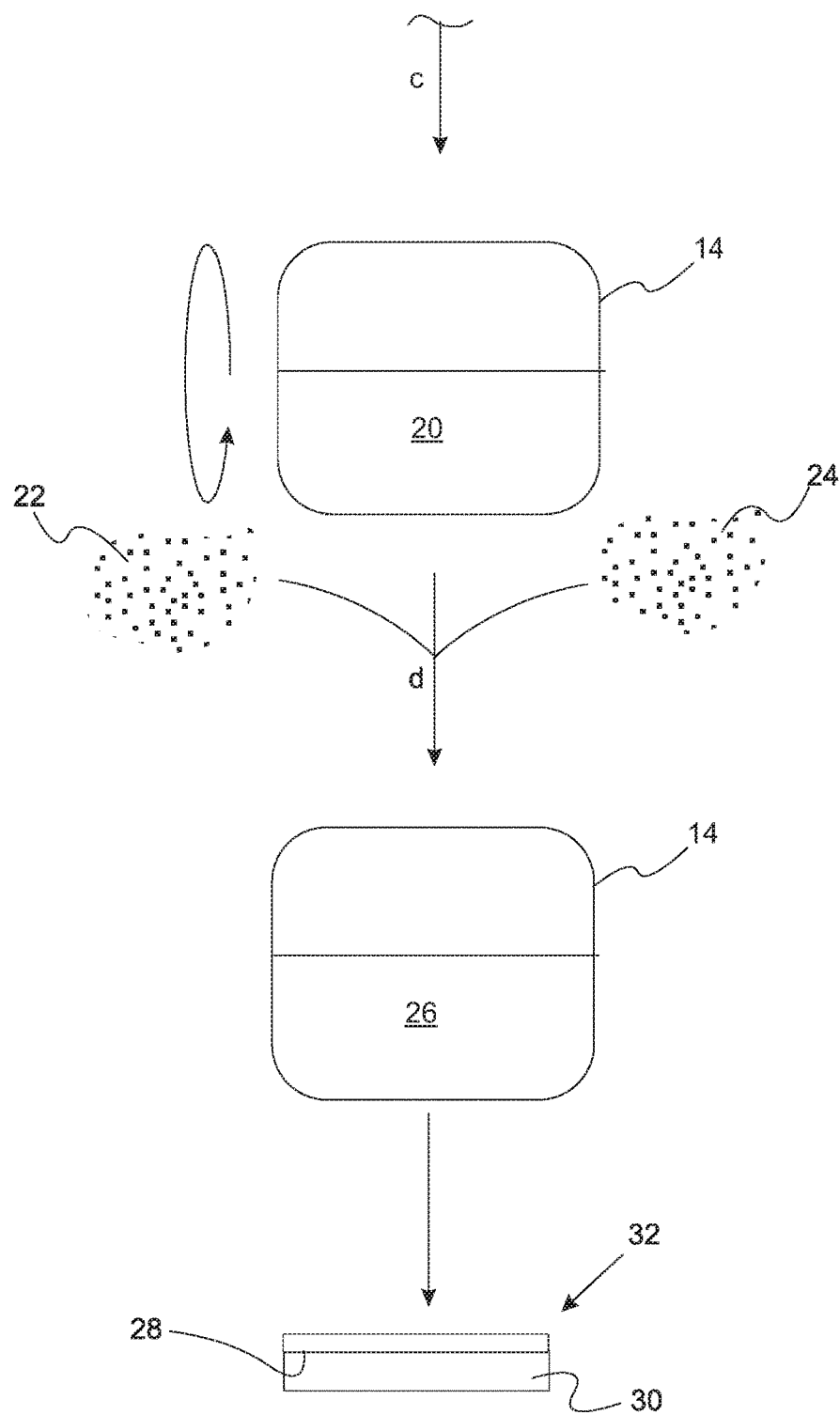

With reference to FIG. 1, a method for forming a pigmented aqueous dispersion for latex paint compositions is schematically illustrated. In step a), a dispersant 10 having pigment affinic groups is combined with water to form an aqueous dispersant mixture 12. In a refinement, the aqueous dispersant mixture 12 is mixed, and in particular, mechanically mixed during or after step a). In step b), at least one pigment 16 is added to the aqueous dispersant mixture 12 to form an aqueous pigment mixture 18. In step c), the aqueous pigment mixture 18 is ground composition until the average particle size is less than 30 microns to form a ground pigmented aqueous dispersion 20. Such grounding can be accomplished by techniques known to those skilled in the art. Examples of such techniques include, but are not limited to, ground by ball milling, bead milling or bar milling. In some refinements, the aqueous pigment mixture 18 is ground composition until the average particle size is, at least in increasing order of preference, 1, 2, 5, 10 or 15 microns. In some refinements, the aqueous pigment mixture 18 is ground composition until the average particle size is at most, in increasing order of preference, 30, 28, 25, 23 or 20 microns. In another variation, the pigmented slurry 20 includes about 30 to 60 weight percent pigment. In some refinements, the pigment slurry 20 includes at least, in increasing order of preference, 20, 25, 30, 35, 40 or 45 weight percent pigment. In other refinements, the pigment slurry 20 includes at most, in increasing order of preference, 70, 65, 60, 55, 50 or 45 weight percent pigment. In some variations, the at least one pigment has a yellow color, and in particular, a color with a CIE 1931 color space dominant wavelength from 570 to 590 nm. Typically, the at least one pigment includes one or more organic pigments. In a variation, the pigments are organic azo compounds, and in particular, monoazo compounds. Examples of useful pigments include, but are not limited to, Sunglow® Yellow 10 G(BASF), Sunglow Yellow 1210 (BASF), SICO Yellow L 1252 HD(BASF), and combinations thereof. In particular, Sunglow Yellow 1210 is a monoazo pigment that includes 2-[(4-chloro-2-nitrophenyl)azo]-N-(2-chlorophenyl)-3-oxobutanamide.

Still referring to FIG. 1, in a variation, resin 22 (i.e., a binder) and paint additive(s) 24 are added to the pigmented aqueous slurry 20 to form a paint composition 26 in step d). Typical binders include, but are not limited to, acrylic, vinyl acrylic (polyvinyl acetate), or styreneated acrylic resins. In step e), surface 28 of substrate 30 is coated with paint composition 26 to form coated substrate 30. In a refinement, surface 28 of coated substrate 30 has a yellow color, and in particular, a color with a CIE 1931 color space dominant wavelength from 570 to 590 nm. Advantageously, surface 28 of coated substrate 30 has a contrast ratio greater than 68. In some refinements, surface 28 of coated substrate 30 has a contrast ratio greater than, in increasing order of preference, 68%, 70%, 75%, or 80%. In other refinements, surface 28 of coated substrate 30 has a contrast ratio less than, in increasing order of preference, 75%, 80%, 85%, 88%, or 90%. In still another refinement, surface 28 of coated substrate 30 has a contrast ratio from about 68% to 90%. In yet another refinement, surface 28 of coated substrate 30 has a contrast ratio from about 75% to 88%.

As set forth above, a dispersant having pigment affinic groups is utilized in step a). Examples of affinic groups include, but are not limited to, carboxyl moieties, phosphoric ester moieties, sulphonic ester moieties, ammonium moieties, and combinations thereof. In particular, the pigment affinic groups are carboxyl groups. In one variation, the dispersant having pigment affinic groups includes a polyacrylate backbone. In a refinement, the dispersant having pigment affinic groups includes polyetheramine side chains attached to the polyacrylate backbone. Typically, the aqueous dispersant mixture includes from about 3 weight percent to 15 weight percent of the dispersant having pigment affinic groups. In a refinement, the aqueous dispersant mixture includes from about 4 weight percent to 8 weight percent of the dispersant having pigment affinic groups. In some refinement, the aqueous dispersant mixture includes, in increasing order of preference, 3, 4, 5, 7, or 10 weight percent of the dispersant having pigment affinic groups. An example of a particularly useful dispersant having pigment affinic groups is DISPERBYK®-190, commercially available from Altana AG located in Wesel, Germany. This dispersant is a solution of a high molecular weight block copolymer with pigment affinic groups. Moreover, this dispersant provides unexpected dispersing efficiency for organic yellow pigments. In a refinement, the aqueous dispersant mixture 12 further includes an additional dispersant such as the ammonium salt of a polycarboxylated polymer or copolymer. Examples of such disperants include TAMOL™ 165A, commercially available from The Dow Chemical company. TAMOL™ 165A is an ammonium salt of a hydrophobic copolymer dispersant.

In a variation, the aqueous pigment mixture and the pigmented aqueous slurry each independently include additional additives. Additives are typically used in low levels to improve such properties as microbial and mildew resistance, viscosity, leveling, splatter control and the like. Examples of such additives include, but are not limited to, additional pigments, fillers, rheology modifiers, titanium oxide surfactants, defoamers, coalescents, biocides, and combinations thereof. An example of a useful defoamer is TEGO FOAMEX™ 810, commercially available from Evonik Industries located in Essen, North Rhine-Westphalia, Germany.

Such dispersants are typically polymeric including high molecular weight polymers with pigment affinic groups. Examples include, but are not limited to, styrene polymers, (meth)acrylates and (meth)acrylamides, block co-polymers, comb polymers comprised from, for instance, styrene derivatives, (meth)acrylates and (meth)acrylamides, polyethylenimines, polyamines, polyurethanes.

The following examples illustrate the various embodiments of the present invention. Those skilled in the art will recognize many variations that are within the spirit of the present invention and scope of the claims.

Table 1 provides examples of the pigment slurries set forth above. The water level and extender pigment levels specified therein ensure that grinding is easy. The ceramic beads were selected to have the right size, hardness, and heat conductivity to make the process feasible. As shown in Table 1, yellow slurry example 1 provides a composition with improved visual hiding and contrast ratio as compared to a commercially available colorant. Behr's Premium Plus Ultra Interior (PPUI) semi-gloss deep base was tinted with the composition of example 1. The resulting paint composition coated a substrate (i.e., a 3 mil Bird bar drawdown on Leneta 1B panel) with a contrast ratio of 72% versus a value of 66% for a commercially available paint. Example 2 is the high solid yellow colorant formula which has a reasonable viscosity and much better visual hiding and contrast ratio as compared to a commercially available colorant. When example 2 is tinted in Behr's Premium Plus Ultra Interior (PPUI) semi-gloss deep base, a coated substrate (i.e., a 3 mil Bird bar drawdown on Leneta 1B panel) has a contrast ratio which reaches 80.6%, as compared to 63% for a commercial paint. The formula set forth in example 3 provides another higher solid yellow colorant. This example has increased viscosity and provides a reasonable indicator of the upper limit for the volume of pigment solids. The contrast ratio for a coating prepared from this composition achieved 85% for a 3 mil draw down.

| Description | 100113-COLORANT-AXL EX 2 | 100113-COLORANT-AXL EX 1 | 100113-COLORANT-AXL EX 3 |
| --- | --- | --- | --- |
| Instruction: WITH MIXER OFF, ADD: | | | |
| WATER | 27.44% | 21.89% | 21.36% |
| Disperbyk - 190 | 6.25% | 5.00% | 7.03% |
| TAMOL - 165A | 0.00% | | 0.00% |
| TEGO FOAMEX 810 | 0.63% | 0.50% | 0.70% |
| Instruction: TURN MIX TO LOW, MIX FOR 5 MIN, TURN HOOD ON, THEN ADD: | | | |
| Sunglow Yellow 1210 | 31.96% | 25.55% | 35.93% |
| SICO Yellow L 1252 HD | 11.28% | 9.02% | 12.70% |
| KRONOS 2310 | 2.38% | 1.90% | 2.68% |
| Vertal 77 Talc | 7.54% | 6.03% | 8.48% |
| Barium Sulfate | 8.76% | 7.00% | 9.85% |
| WATER | 2.63% | 6.57% | 0.00% |
| Instruction: MIX 5 MINUTES, TURN MIX OFF, ADD CERAMIC BEADS IN, THEN ADD: | | | |
| WATER | 0 | 15.64% | 0.00% |
| Proxel AQ | 0.50% | 0.40% | 0.56% |
| BYK 022 DEFOAMER (P-65 C/R) | 0.63% | 0.50% | 0.70% |
| Instruction: TURN MIX TO HIGH (3000 RPM) MIX FOR 20 MINUTES, THEN CHECK GRIND TO PASS 6 HEGMAN. SAMPLE 1 QT TO QC. | | | |
| TOTAL | 100.0% | 100.0% | 100.0% |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A method comprising:
   a) combining a dispersant having pigment affinic groups with water to form an aqueous dispersant mixture, the dispersant having pigment affinic groups including a polyacrylate backbone and polyetheramine side chains attached to the polyacrylate backbone, further including an additional dispersant that is ammonium salt of a polycarboxylated polymer or copolymer;
   b) adding at least one pigment to the aqueous dispersant mixture to form an aqueous pigment composition; and
   c) grinding the aqueous pigment composition until the average particle size is less than 30 microns to form a pigmented aqueous slurry, the aqueous pigment composition including about 30 to 60 weight percent pigment wherein the pigment has a color with a CIE 1931 color space dominant wavelength from 570 to 590 nm.

2. The method of claim 1 wherein the aqueous dispersant mixture is mixed after step a), the aqueous pigment composition is mixed after step b), and the pigmented aqueous slurry is mixed after step c).

3. The method of claim 1 further comprising:
   d) combining resin and paint additive to the pigmented aqueous slurry to form a paint composition.

4. The method of claim 1 wherein the pigment affinic groups are selected from the group consisting of carboxyl moieties, phosphoric ester moieties, sulphonic ester moieties, ammonium moieties, and combinations thereof.

5. The method of claim 1 wherein the pigment affinic groups are carboxyl groups.

6. The method of claim 1 wherein the aqueous pigment composition is ground by ball milling, bead milling or bar milling.

7. The method of claim 1 wherein the aqueous dispersant mixture includes from about 3 weight percent to 15 weight percent of the dispersant having pigment affinic groups.

8. The method of claim 1 wherein the aqueous dispersant mixture includes from about 4 weight percent to 8 weight percent of the dispersant having pigment affinic groups.

9. The method of claim 1 wherein the aqueous pigment composition and the pigmented aqueous slurry each independently include an additive selected from the group consisting of additional pigments, fillers, rheology modifiers, titanium oxide surfactants, defoamers, coalescents, biocides, and combinations thereof.

\* \* \* \* \*